_United States Patent Office_

3,471,779
Patented Oct. 7, 1969

3,471,779
METHOD AND APPARATUS FOR TESTING DYNAMIC RESPONSE USING CHAIN CODE INPUT FUNCTION
Anthony John Ley, Farnborough, England, assignor to The Solartron Electronic Group Limited, Farnborough, England, a corporation of the United Kingdom
Filed Sept. 23, 1965, Ser. No. 490,172
Claims priority, application Great Britain, Sept. 25, 1964, 39,255/64
Int. Cl. G01r 27/00, 15/10
U.S. Cl. 324—57                9 Claims

ABSTRACT OF THE DISCLOSURE

The method includes applying a chain code test function to the input of the apparatus to be tested, determining the difference between the resulting output of the apparatus and the test function, and measuring the RMS value of this difference. Where the method is used to test apparatus with a feedback loop, the RMS value of the resulting feedback signal is measured. The apparatus includes a multi-stage shift register driven by a clock pulse generator to generate a pseudo-random binary chain code test signal function of a predetermined number of intervals. An add/subtract circuit determines the difference between the test function and the output of the apparatus resulting from the test function, and the RMS value of the difference is determined with an RMS meter of unique construction. In one arrangement of the apparatus, a filter having a particular network transform is connected between the test function generator and the apparatus under test.

---

Figure 1:
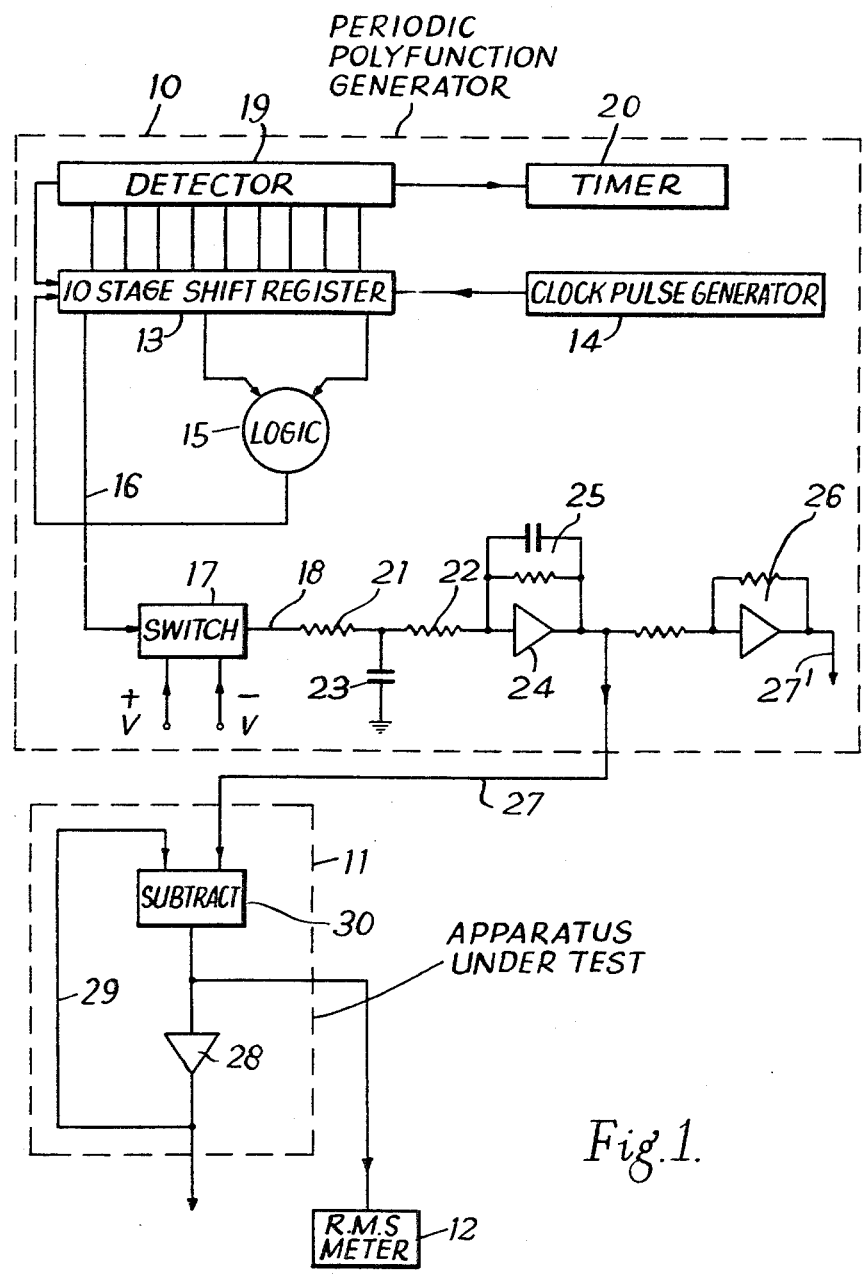

The present invention relates to a method of testing the dynamic response of apparatus responsive to a signal applied to its input for providing a substantially linearly related signal at its output.

Such apparatus may be of any form whether electrical, mechanical, hydraulic or pneumatic or any combination thereof and the input and output signals may be electrical, mechanical, hydraulic or pneumatic.

Examples of such apparatus are electrical amplifiers and positional-error-feedback control systems, and hydraulic and pneumatic control systems.

It may be useful to test such apparatus at various stages in its evolution. The designer may wish, for example, to check his calculations; for such purpose he will need a variety of information readily comparable with this theoretical figures. The production inspector, or the serviceman in the field will, however, be better served by testing means which indicate clearly whether a performance specification is fulfilled or not, preferably together with a quantitative measure of the degree of success or failure. The present invention is specially directed to the latter end.

It may not be necessary to remind those skilled in the art that many of the apparatuses referred to operate in practice in the presence of "noise," viz: random inputs of various origins which counterfeit the signal input.

Known methods of testing the dynamic response properties of apparatus fall into three main categories, namely testing with an input signal which is (a) a sinusoidal function, (b) a single transient function and (c) a random noise function.

In category (a) the amplitudes and phases of a series of sinusoidal inputs are correlated with the amplitudes and phases of the outputs resulting therefrom. This method yields information valuable to a designer but the apparatus is bulky and costly and the results are difficult for a serviceman in the field to interpret. Furthermore, it may take a long time to complete a series of readings for interpretation.

The method of category (b) is unsuitable unless the apparatus is free of "noise." Furthermore the results are again difficult for a serviceman to interpret in the field.

The method of category (c) is suitable for most purposes including use by servicemen but again a long time is needed especially for testing low-frequency apparatus to ensure that a statistically invariate sample of the input has been used. For example it can be shown that to obtain an answer correct within ±1% from a test of apparatus having a simple response lag of 1 c./s. would take about 45 minutes.

An object of the present invention is to provide an improved method of testing the dynamic response of apparatus in which a substantial reduction can be effected in the time required to make a test compared with the known methods of categories (a) and (c) referred to, and which can readily be carried out and interpreted. With the present invention an answer correct within ±1% from a test of apparatus having a simple response lag of 1 c./s. would take about 12 seconds.

According to the present invention a method of testing the dynamic response of apparatus responsive to an input signal to provide an output signal substantially linearly related thereto, comprises the steps of applying directly or indirectly to the apparatus one complete cycle of a test input signal in the form of a periodic polyfunction of a substantial number of periods, and determining the root-mean-square value of the error between the test input signal and the resulting output signal from the apparatus under test or a signal related to the said resulting output signal. By the term "periodic polyfunction" is meant a function of time each cycle whereof consists of a series of consecutive equal time periods throughout each of which the function has any one but only one of a set of discrete values. By the term "substantial number" is meant at least 15. Preferably there are many more than 15 periods in each cycle.

It will be seen that "periodic polyfunction" thus defined is an extension of a "periodic difunction," which is a well-known term for a function capable of assuming one of only two values. A difunction is therefore a particular case of a polyfunction. We shall refer to a device capable of generating an electrical signal which is a periodic polyfunction as a "periodic polyfunction generator."

Further according to the present invention test-signal generating and measuring apparatus for testing the dynamic response of apparatus responsive to an input signal to provide an output signal substantially linearly related thereto, comprises a periodic polyfunction generator having its output connected to an input of an add/subtract circuit the output of which is connected to a root-mean-square meter. The apparatus to be tested being in operation so connected to the periodic polyfunction generator and to the add/subtract circuit that one complete cycle of a test signal in the form of a periodic polyfunction of a substantial number of periods generated by the periodic polyfunction generator is applied to the apparatus to be tested, and a resulting output signal from the apparatus to be tested is applied to the add/subtract circuit, the root-mean-square meter consequently registering the root-mean-square value of the error between the test input signal and the said resulting output signal.

By an add/subtract circuit is meant a circuit the electrical quantity output of which is the aglebraic sum of the electrical quantities of its inputs. Such circuits are discussed, for example in "Electrical Analog Computers" by Korn & Korn published by McGraw Hill Book Co., Inc., New York, 1952, p. 12.

By root-mean-square meter is meant a meter the indication of which corresponds to the root-mean-squared value of the input. Such device will subsequently be called an RMS meter.

Figure 2:
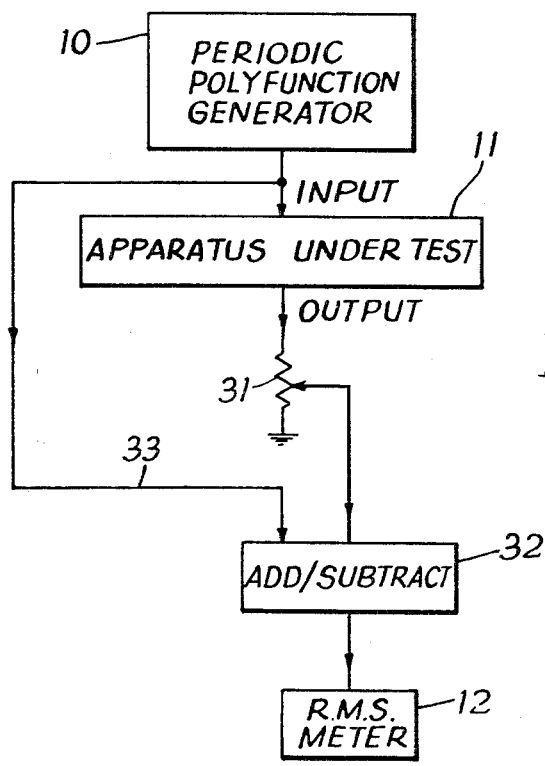
Figure 3:
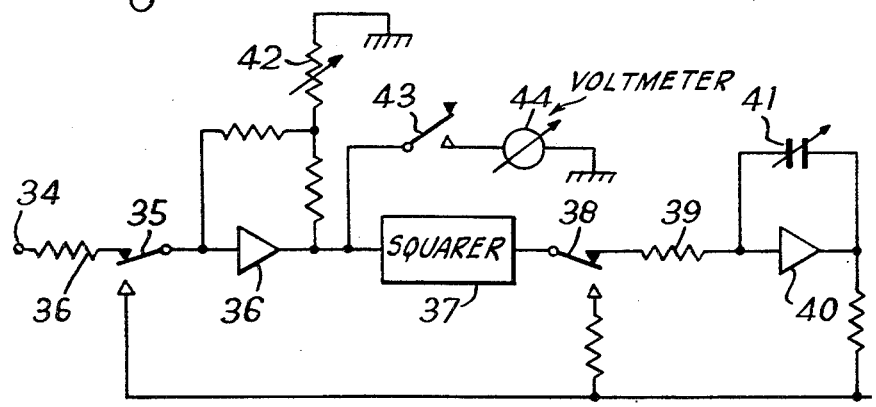

The invention will now be described by way of example with reference to the accompanying drawings, in which:

FIG. 1 is a block circuit diagram showing a periodic polyfunction generator and an RMS meter connected to the apparatus under test, FIG. 2 is a block schematic diagram showing a periodic polyfunction generator connected to apparatus under test in which an error signal is not available for test purposes, and a predetermined proportion of the output of the apparatus under test connected to an RMS meter together with the input signal through an add/subtract circuit, and FIG. 3 is a circuit of a suitable RMS meter.

Before proceeding with a description of the embodiments shown, reference will be made to the random-input response of stationary systems. Since control systems have to operate on the non-predictable, much work has been done on the response of linear systems to random inputs, and techniques have been proposed by Wiener (see "Extrapolation, Interpolation and Smoothing of Stationary Time Series" published by John Wiley & Sons, 1957) and others to design systems in such a way that an error criterion is minimised. A popular criterion is the RMS error; for a discussion of this see Korn and Korn, loc. cit., p . 70.

Let $x(t)$ be the input and $y(t)$ the output of a linear system whose impulse response is $h(t)$. The error is then $y-x=v(t)$; and the system may be regarded as a new system whose input is $x$ and output $v$. Let the impulse response of the new system be $f(t)$ which has one-to-one correspondence with $h(t)$.

It is now required to ascertain the RMS value of $v(t)$ in terms of $f(t)$ and some characteristic of the input signal.

If: $\tau$; $\tau_1$; $\tau_2$ are all measures of time-difference between the application of an impulse and a given value of the response to it, and T is an arbitrary limit of integration of $t$, used in forming the definition of an autocorrelation function, then from $$v(t) = \int_{-\infty}^{\infty} f(\tau) \cdot x(t-\tau) \cdot d\tau$$

it can be shown that $$\overline{v^2(t)} = \int_{-\infty}^{\infty} \int_{-\infty}^{\infty} f(\tau_1) \cdot f(\tau_2) \cdot \phi_{xx}(\tau_1 - \tau_2) d\tau_1 d\tau_2$$

where $\phi_{xx}$ is the autocorrelation function of $x$ and is defined by $$\phi_{xx}(\tau) \equiv \mathop{\mathrm{Lt}}_{T \to \infty} \frac{1}{2T} \int_{-T}^{T} x(t) x(t+\tau) dt$$

Putting $\tau = \tau_1 - \tau_2$ we observe that $v^2(t)$ is completely defined, for a given linear system, by the autocorrelation function of the input.

For a full discussion of the impulse response of a network, of correlation functions including auto-correlation functions, and the relations among them the reader is referred to Wiener (loc. cit:). The object of the foregoing brief rehearsal of known network theory applicable to servomechanisms is to describe precisely, in terms of that theory, the nature of our input signal and how we use the same to measure the criterion of goodness of servo systems.

We now proceed, according to the method of the invention, to produce an input signal $u(t)$ having the property $$\frac{1}{T_1} \int_0^{T_1} u(t) \cdot u(t+\tau) dt \cdot = \phi_{xx}(\tau)$$

for the chosen period of application, 0 to $T_1$. A transient signal having zero or a small value for $t > T_1$ would, of course, have this property but as has already been stated, its power level must be limited and hence the result would be affected by system noise.

Thus also according to the invention the input signal is in the form of a periodic polyfunction of a substantial number of periods in each cycle. By using neither more nor less than a single cycle the same test result can be achieved as would be achieved with a random noise function of infinite time. This provides a substantial advantage enabling the present invention to be used for reliable and rapid testing which can readily be interpreted.

Referring now to FIG. 1, a periodic polyfunction generator shown within a broken line 10 is connected to apparatus under test shown within a broken line 11 and an RMS meter 12 is connected to the apparatus under test in such a manner as to measure the FMS value of an error signal in the apparatus under test.

The periodic polyfunction generator 10 makes use of a chain code generator which in itself is a known device (see "Correlation Analysis of Process Dynamics Using Pseudo-Random Binary Test Perturbations" by P. A. N. Briggs, P. H. Hammond, M. T. C. Hughes and G. O. Plumb. Proceedings of the Institution of Mechanical Engineers 1964–65, vol. 179, Part 3H). Chain codes are also known as maximal length sequences or pseudo random binary sequences. The chain code generator consists in this embodiment of a ten-stage binary shift register 13 driven by a clock pulse generator 14 The binary shift register has an associated feedback system generating its approximate input from the state of its output and one or more intermediate cells of the register (one being shown here) through a logic circuit indicated at 15. The logic required, and the way in which a chain code results, is detailed in the foregoing reference. The output from the ten-stage shift register 13 can be selected in any suitable way but in the embodiment shown only one stage of the register is connected to the output 16 whereby the polyfunction becomes a difunction.

The output 16 is connected to a switch 17 to which reference potentials of +V and —V are applied. Thus the output appearing at 18 is of +V or —V depending upon the state of the stage in the shift register to which the output connection 16 is coupled.

The logic for the generation of the chain code is such that the shift register assumes all possible states, except the all zero state, before repeating a state. Accordingly if T is the clock period, the complete cycle repeats in $(2^{10}-1)$ $T = 1023T$. (See aforementioned article by P. A. N. Briggs et al.). In normal operation the all zero state never occurs: if it should occur on switching on the supplies it is detected by the detector 19 and a one is inserted into the first stage. The detector 19 consists of a set of coincidence gates arranged to give two more facilities, namely (a) to impose a given initial code on the register on a switch being closed which initiates operation of a timer 20 which can be in the form of an integrating voltmeter, (b) to mark the recurrence of the initial code and signal the end of integration (alternatively in this aspect the detector could be arranged to mark the occurrence of a given code and to send two consecutive signals, one at the start and the other at the end of integration).

The output, having sharp transitions from one level to the other, might overload certain apparatus or systems having differentiating stages within it. Accordingly it is desirable to apply the input signal indirectly by smoothing the difunction somewhat with a filter. For this purpose it is passed through a filter which is partly passive and partly of the feedback type and having a network transform $1/1(1+2pT)^2$. In Korn & Korn (loc. cit:) p. 147 are shown examples of how to design filters to possess various network transforms. It is to be emphasised that this filter is neither essential to the invention nor an optimum in a given application but it has been found generally suitable for a filter of this form as shown connected to the output 18 of the switch 17 and comprising in its passive part the resistors 21 and 22 and capacitor 23. In the active part of the filter there is a feedback amplifier 24 with feedback circuit 25. Systems designed on a strict RMS error criterion are per se designed to work from a given spectrum, as is clear from a study of Wiener (loc. cit:). For proper tests of such systems other more appropriate filters may be needed. A circuit 26 for reversing the output of the filter will be described later.

Thus the output of the periodic polyfunction generator appears in the connection 27 and is in the form of a difunction somewhat smoothed by the action of the filter.

The apparatus under test shown at 11 is in this example shown to be in the form of a simple error feedback device comprising what is indicated as an amplifier 28 with a feedback part 29 connected to a subtracting circuit 30 to which input is also applied through the connection 27 from the periodic polyfunction generator 10.

Connected to the output of the subtracting circuit 30 at which the error signal appears indicating the error between the input signal and the output signal is the RMS meter 12.

In operation the clock pulse generator is set to a frequency dependent upon the nature of the apparatus to be tested and the timer 20 is also set to provide a predetermined period of integration. At the end of the integration period the RMS meter is read and the value shown by the meter provides an indication as to whether the apparatus under test is above or below a predetermined level of performance, together with a measure of its relative success or failure.

To reduce the RMS error to a minimum is a well-known design criterion and techniques for enabling the RMS error to be minimised have been proposed by Wiener and others.

Thus it will be appreciated that for any given piece of apparatus the designer can specify a given maximum RMS error for the satisfactory performance of the apparatus within a predetermined context. The method according to the invention can then be used at any subsequent time quite simply by a serviceman in the field and an indication on the meter 12 of an RMS error above the designer's specified limit would indicate that the apparatus is unsatisfactory whereas an indication on the RMS meter 12 below the designer's limit would indicate that the apparatus under test is satisfactory for operation.

Thus interpretation of the result provided by the method is extremely simple and all that the serviceman needs to be instructed in is in relation to the setting of the timer 20 and the clock pulse generator 14 to suit the designer's requirements for any particular piece of apparatus to be tested.

It is not always possible in testing apparatus to have the error signal directly available for applications to the R.M.S. meter 12 as shown in FIG. 1 and it is then necessary to use a different method of effecting the reading. This is shown in FIG. 2 from which it will be seen that the periodic polyfunction generator 10 is connected to the apparatus 11 under test as before. The output of the apparatus under test is applied to a potentiometer 31, the slider of which is connected to an add/subtract circuit 32. The periodic polyfunction test signal applied to the apparatus under test is also applied to the add/subtract circuit 32 through a connection 33 and the output of the add/subtract circuit 32 is applied to the R.M.S. meter 12. In operation the potentiometer 31 is adjusted so as to minimise the difference signal fed from the circuit 32 to the R.M.S. meter 12. Otherwise the mode of use is as described in relations to FIG. 1.

To enable the procedure to be carried out in relation to FIG. 2 with various forms of apparatus to be tested, the inverting circuit 26 is provided in the periodic polyfunction generator 10 as shown in FIG. 1 and providing a separate output at 27'. Inverting circuits containing amplifiers are explained in Korn & Korn, loc. cit., page 35. The R.M.S. meter 12 can take any suitable form but a simple and particularly suitable form of R.M.S. voltage meter for use with the invention is shown in FIG. 3. The input to the meter is at a terminal 34 which is connected to a switch 35 through a resistor 36. The output of the switch 25 is coupled through an amplifier 36 to a squarer 37 of which the output is connected through a switch 38 and a resistor 39 to an integrating amplifier 40 with its associated feedback capacitor 41.

The amplifier 36 is a feedback amplifier having a range control resistor 42 for adjusting the gain of the amplifier 36. The output of the amplifier 36 is also connected through a switch 43 to a voltmeter 44.

Throughout the integration period the switches 35, 38 and 43 are arranged to be in the position shown. At the end of the integration period it is arranged that the switches move to the alternative setting to that shown whereby the output of the integrating amplifier is put through a feedback circuit containing the amplifier 36 and the squarer 37. In accordance with known principles of feedback the output of the amplifier 36 is a voltage proportional to the square root of the output of the amplifier 40. This voltage which is the root of the integrated square of the input is read by the voltmeter 44. The charge in the capacitor 41 persists long enough to keep the reading steady on the voltmeter until it is recorded.

It will be noted that the capacitor 41 in the integrating amplifier is made variable and it is arranged to be varied in proportion to the measurement time chosen, that is to say in proportion to the clock pulse period.

It will be apparent to those skilled in the art that various modifications may be made to the arrangement described. For instance, a polyfunction not a difunction can be generated and used as a testing signal by connecting not only the last but also other stages of the 10-stage shift register 13 via switches additional to 17 to the apparatus under test. Such connection may be made from voltages, or through resistors, proportioned so as to weight differently the contribution of the various stages. Again, several stages of the shift register may feed through weighting resistors polyfunctions of current having opposite sign to terminals $+v$ and $-v$ of switch 17, which switch is changed over in response to another stage. The indication of the R.M.S. meter may take the form of a simple "go/no-go" signal. The timer 20 may be connected via a counter to the clock pulse generator 14, so as to be automatically stopped at the end of a cycle. The timer and clock pulse generator, so connected, may be arranged sequentially to provide more than one testing frequency with a corresponding sequential switching of capacitor 41. The logic 15 may be switched to provide chain codes of selected different lengths.

What is claimed is:

1. A method of testing, with extreme accuracy and in a short period of time, the dynamic response of apparatus having an input and an output and responsive to an input signal to provide an output signal substantially linearly related thereto comprising, in combination, applying to said input at least one complete cycle of a pseudo-random binary sequence chain code test function of a predetermined substantial number of periods, and measuring the root mean square value of the error between the test function and the resulting output of the apparatus for a complete cycle of the test function, whereby the root mean square value obtained can be compared with a predetermined standard value for like apparatus to determine the dynamic response of the tested apparatus.

2. A method of rapidly testing the dynamic response of an apparatus having an input and an output and responsive to an input signal to provide an output signal substantially linearly related to the input signal comprising, in combination, applying to said input a complete cycle of a pseudo-random binary sequence chain code test function of a substantial number of periods, and measuring the root mean square value of the difference between the test function and the resulting output of the apparatus for a complete cycle of the test function.

3. A method of testing the dynamic response of an apparatus having an input, an output, and a feedback loop which returns to the input a signal related to the difference between an input signal and an output signal, and which apparatus is responsive to an input signal to provide an output signal substantially linearly related to the input signal comprising, in combination, applying to said input a complete cycle of a pseudo-random binary sequence chain code test function of a substantial number of periods, and measuring the root mean square value of the resulting signal in said feedback loop.

4. A method of testing the dynamic response of apparatus having an input and an output and being responsive to an input signal to provide an output signal substantially linearly related thereto, comprising the steps of generating a test function having a series of consecutive time periods throughout which the function has any one, but only one, of a set of discrete values, applying said test function to a filter having a network transform of $1/(1+2pt)^2$, applying said filter network output to the input of said apparatus to be tested, and measuring the root mean square value of the difference between said filtered test input signal and resulting apparatus output signal.

5. A test arrangement for rapidly testing the dynamic response of an apparatus having an input and an output and responsive to an input signal to provide an output signal substantially linearly related thereto comprising, in combination, a test signal generator having an output connected to said apparatus input, said signal generator including generating means for generating a chain code test function of predetermined substantial number of intervals, and measuring means including a root mean square meter connected to the output of the apparatus and the output of said signal generator, for measuring the root mean square value of the difference between said test signal and said apparatus output.

6. A test arrangement according to claim 5 wherein said generating means comprises a multistage binary shift register for generating a pseudo-random test function; and clock pulse generating means connected to said shift register to drive said register and producing the same number of clock pulses as said predetermined number of intervals.

7. A test arrangement according to claim 6 wherein said clock pulse generating means generates clock pulses of a substantially constant frequency to drive said register, and wherein the frequency of said clock pulse generating means is adjustable, whereby the clock pulse generating means can be set to a frequency dependent upon the nature of the apparatus.

8. A test arrangement according to claim 5 wherein said measuring means further includes an add/subtract circuit having an input connected to said test signal generator output and to said apparatus output, and having an output connected to the input of said root mean square meter.

9. A test arrangement for testing the dynamic response of an apparatus having an input and an output and responsive to an input signal to provide an output signal substantially linearly related thereto comprising a test signal generator having an output connected to said apparatus input, said signal generator including chain code generating means for generating a chain code test signal; and connected to the output of the apparatus and the output of said signal generator, measuring means for measuring the root mean square value of the difference between said test signal and said apparatus output, said measuring means including a root mean square meter comprising a first two-position switch having a first fixed terminal connected to said add/subtract circuit and having a second fixed terminal and a toggle terminal, a first feedback amplifier having an input connected to said first two-position switch toggle and having an output, a range control resistor having an input connected to said feedback amplifier output and having an output connected to ground, a one-position switch having an input connected to said feedback amplifier and output and having an output, a voltmeter having an input connected to said one-position switch output and having an output connected to ground, a squarer having an input connected to said feedback amplifier output and an output, a second two-position switch having a toggle terminal connected to said squarer output and having first and second fixed terminals, an integrating amplifier having an input terminal connected to said second toggle switch first fixed termial and an output connected to said first toggle switch second terminal, and to said second toggle switch first terminal, a variable integrating capacitor connected to said integrating amplifier input and said integrating amplifier output, said two-position switch toggles being in contact with said first fixed terminals during a predetermined period of time coinciding with one complete cycle of said chain code generating means, said one-position switch being open during said predetermined perod of time, said two-position switch toggles being movable to said second fixed terminals and said one-position switch being closed after the termination of said predetermined period of time whereby the square of the voltage stored in said variable capacitor is registered on the voltmeter.

References Cited

UNITED STATES PATENTS

| | | | |
|---|---|---|---|
| 2,909,620 | 10/1959 | Graef | 324—57 XR |
| 3,032,711 | 5/1962 | Gilchrist | 324—57 |
| 3,340,469 | 9/1967 | Catherall et al. | 328—27 XR |
| 3,345,562 | 10/1967 | Rockwell | 324—119 |
| 2,618,686 | 11/1952 | De Lange | 324—57 |
| 3,354,297 | 11/1967 | Anderson et al. | 235—181 |
| 3,388,326 | 6/1968 | Brooks | 324—57 |

FOREIGN PATENTS 129,749     1960     U.S.S.R.

OTHER REFERENCES

Louis, E. G., Practical Techniques of Square-Wave Testing, Radio & TV News, July 1957, pp. 64–66 and 133 (copy in 324–57).

EDWARD E. KUBASIEWICZ, Primary Examiner

U.S. Cl. X.R.

324—132; 328—37; 235—151.31, 150.53